(12) United States Patent
Lutjen et al.

(10) Patent No.: US 12,416,242 B2
(45) Date of Patent: Sep. 16, 2025

(54) BLADE OUTER AIR SEAL WITH COMPLIANT SEAL

(71) Applicant: RTX CORPORATION, Farmington, CT (US)

(72) Inventors: Paul M. Lutjen, Kennebunkport, ME (US); Daniel S. Rogers, Lyman, ME (US); Timothy J. Harding, Wethersfield, CT (US); James E. Weisheit, Kennebunk, ME (US); Morely S. Sherman, Biddeford, ME (US); Mikayla M. Rogers, Portland, ME (US); Marshall F. Thayer, Waterboro, ME (US); Joseph Micucci, Scarborough, ME (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/456,787

(22) Filed: Aug. 28, 2023

(65) Prior Publication Data

US 2024/0110488 A1    Apr. 4, 2024

Related U.S. Application Data

(60) Provisional application No. 63/411,893, filed on Sep. 30, 2022.

(51) Int. Cl.
| | |
|---|---|
| *F01D 11/16* | (2006.01) |
| *F01D 11/00* | (2006.01) |
| *F01D 11/08* | (2006.01) |

(52) U.S. Cl.
CPC ............ *F01D 11/16* (2013.01); *F01D 11/005* (2013.01); *F01D 11/08* (2013.01); *F05D 2240/55* (2013.01); *F05D 2260/38* (2013.01); *F05D 2300/6033* (2013.01)

(58) Field of Classification Search
CPC ........ F01D 11/16; F01D 11/08; F01D 11/005; F05D 2240/55; F05D 2260/38; F05D 2300/6033
See application file for complete search history.

(56) References Cited

U.S. PATENT DOCUMENTS

| | | | |
|---|---|---|---|
| 6,821,085 B2 * | 11/2004 | Darkins, Jr. | ............ F01D 11/08 415/173.1 |
| 8,079,807 B2 | 12/2011 | Shapiro et al. | |
| 8,661,828 B2 * | 3/2014 | Pieussergues | ............ F02C 7/28 60/753 |
| 9,874,104 B2 * | 1/2018 | Shapiro | ................... F01D 11/08 |

(Continued)

OTHER PUBLICATIONS

European Search Report for European Patent Application No. 23201303.7 mailed Feb. 15, 2024.

*Primary Examiner* — Nathaniel E Wiehe
*Assistant Examiner* — Theodore C Ribadeneyra
(74) *Attorney, Agent, or Firm* — Carlson, Gaskey & Olds, P.C.

(57) ABSTRACT

A gas turbine engine includes a turbine section that has a ceramic matrix composite body that defines a core gaspath side that a row of blades, a forward end, an aft end, and circumferential sides. The forward end abuts at least one vane of a first row of vanes, and the aft end including a seal channel. A compliant seal is disposed in the seal channel and seals against at least one vane of a second row of vanes.

8 Claims, 2 Drawing Sheets

(56) References Cited

U.S. PATENT DOCUMENTS

| | | |
|---|---|---|
| 10,392,967 B2 | 8/2019 | Correia et al. |
| 10,422,239 B2 * | 9/2019 | Mitchell .................. F16J 15/32 |
| 10,487,678 B2 | 11/2019 | Tyler, Jr. et al. |
| 11,028,712 B2 | 6/2021 | Tyler et al. |
| 11,085,314 B2 * | 8/2021 | Davis .................... F01D 25/246 |
| 11,773,751 B1 * | 10/2023 | Freeman ................. F01D 11/08 |
| | | 415/173.1 |
| 2010/0111678 A1 | 5/2010 | Habarou et al. |
| 2013/0113168 A1 | 5/2013 | Lutjen et al. |
| 2017/0130600 A1 | 5/2017 | Shapiro et al. |
| 2021/0189909 A1 * | 6/2021 | Sippel .................... F01D 11/08 |

* cited by examiner

BLADE OUTER AIR SEAL WITH COMPLIANT SEAL

CROSS REFERENCE TO RELATED APPLICATION

The present disclosure claims priority to U.S. Provisional Application No. 63/411,893 filed Sep. 30, 2022.

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Components in the turbine section are typically formed of a superalloy and may include thermal barrier coatings to extend temperature capability and lifetime. Ceramic matrix composite ("CMC") materials are also being considered for turbine components. Among other attractive properties, CMCs have high temperature resistance. Despite this attribute, however, there are unique challenges to implementing CMCs in turbine components.

SUMMARY

A gas turbine engine according to an example of the present disclosure includes a turbine section that has a first row of vanes disposed about an engine axis, a second row of vanes axially spaced from the first row of vanes, and a row of blades axially between the first row of vanes and the second row of vanes. There is a row of blade outer air seals axially between the first row of vanes and the second row of vanes and that is situated radially outwardly of the row of blades. Each blade outer air seal has a ceramic matrix composite body that defines a core gaspath side facing the row of blades, a forward end, an aft end, and circumferential sides. The forward end abuts at least one of the vanes of the first row of vanes. The aft end has a seal channel A compliant seal is disposed in the seal channel and seals against at least one of the vanes of the second row of vanes.

In a further embodiment of any of the foregoing embodiments, the compliant seal is a spring seal.

In a further embodiment of any of the foregoing embodiments, the spring seal is a W-seal.

In a further embodiment of any of the foregoing embodiments, the compliant seal is a rope seal.

In a further embodiment of any of the foregoing embodiments, the ceramic matrix composite body defines a non-core gaspath side and includes a pair of flanges that projects from the non-core gaspath side, and the pair of flanges includes first and second pin holes that are aligned to receive a pin.

In a further embodiment of any of the foregoing embodiments, the aft end of the ceramic matrix composite body includes radially inner and outer walls that define the seal channel therebetween.

In a further embodiment of any of the foregoing embodiments, the compliant seal is a full hoop around the engine axis.

In a further embodiment of any of the foregoing embodiments, thermal expansion and thermal contraction of the least one of the vanes of the first row of vanes that is abutting the blade outer air seal causes axial movement of the blade outer air seal to compress and decompress, respectively, the compliant seal.

In a further embodiment of any of the foregoing embodiments, the vanes of the first row of vanes abut each of the blade outer air seals at a respective face seal, and the compliant seal biases the blade outer air seal in an axial forward direction to maintain contact in the face seal.

A blade outer air seal according to an example of the present disclosure includes a ceramic matrix composite body that defines a core gaspath side, a forward end, an aft end, and circumferential sides. The aft end has a seal channel A compliant seal is disposed in the seal channel.

In a further embodiment of any of the foregoing embodiments, the compliant seal is a spring seal.

In a further embodiment of any of the foregoing embodiments, the spring seal is a W-seal.

In a further embodiment of any of the foregoing embodiments, the compliant seal is a rope seal.

In a further embodiment of any of the foregoing embodiments, the ceramic matrix composite body defines a non-core gaspath side and includes a pair of flanges that projects from the non-core gaspath side, and the pair of flanges includes first and second pin holes that are aligned to receive a pin.

In a further embodiment of any of the foregoing embodiments, the aft end of the ceramic matrix composite body includes radially inner and outer walls that define the seal channel therebetween.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
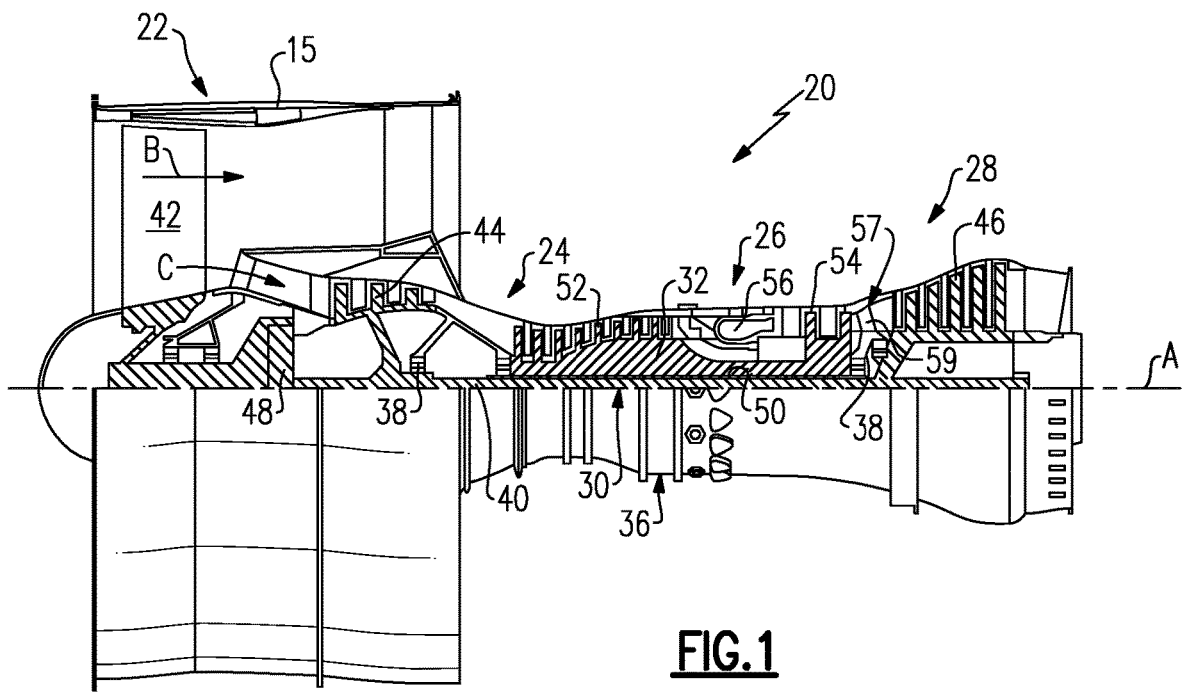
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
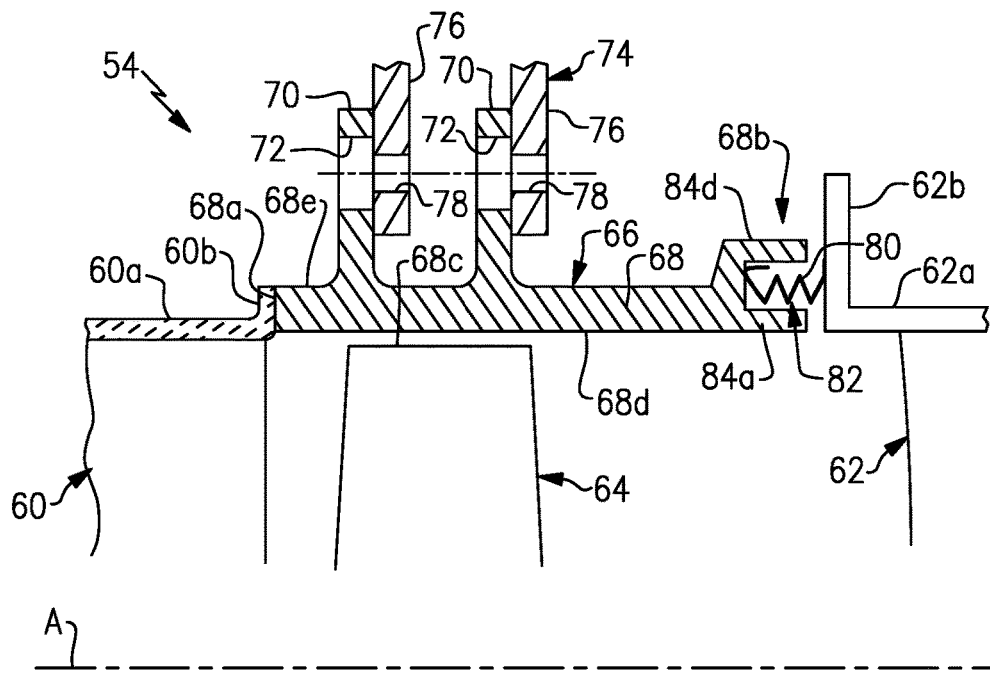
FIG. 2 illustrates a turbine section from the engine of FIG. 1.

FIG. 2 illustrates a portion of the high pressure turbine 54 but is also applicable to the low pressure turbine 46. This section of the turbine 54 includes a first row of vanes 60 and a second row of vanes 62 axially spaced from the first row of vanes 60. There is a row of rotatable blades 64 axially between the first row of vanes 60 and the second row of vanes 62. A row of blade outer air seals 66 ("BOAS 66") is located axially between the first row of vanes 60 and the second row of vanes 62.

Each BOAS 66 is situated radially outwardly of the row of blades 64 and is comprised of a ceramic matrix composite body 68 ("CMC body 68"). A CMC material is comprised of one or more ceramic fiber plies in a ceramic matrix. Example ceramic matrices are silicon-containing ceramic, such as but not limited to, a silicon carbide (SiC) matrix or a silicon nitride (Si3N4) matrix. Example ceramic reinforcement of the CMC are silicon-containing ceramic fibers, such as but not limited to, silicon carbide (SiC) fiber or silicon nitride (Si3N4) fibers. The CMC may be, but is not limited to, a SiC/SiC ceramic matrix composite in which SiC fiber plies are disposed within a SiC matrix. A fiber ply has a fiber architecture, which refers to an ordered arrangement of the fiber tows relative to one another, such as a 2D woven ply or a 3D structure.

The CMC body 68 defines a forward end 68a, an aft end 68b, circumferential sides 68c, a core gaspath side 68d facing the row of blades 64, and a non-core gaspath side 68e opposite the core gaspath side 68d. There is a pair of flanges 70 that project radially from the non-core gaspath side 68e for mounting the BOAS 68 in the engine 20. For example, the flanges 70 define pin holes 72 that are aligned to receive a support pin there through. In that regard, a mating support structure 74, such as an engine case or other hardware, includes complementary flanges 76 and pin holes 78. A support pin is received through the pin holes 72/78 to secure the BOAS 66 to the support structure 74. The pinned joint substantially radially supports the BOAS 66 but the joint is non-rigid and permits some movement of the BOAS 66 so as to avoid over-constraint.

The forward end 68a of the CMC body 68 abuts at least one of the vanes 60 of the first row of vanes 60. For instance, each of the vanes 60 includes a platform 60a with a radially-projecting flange 60b that the CMC body 68 bears against. The joint formed by the contact between the flange 60b and the CMC body 68 is rigid in that the vane 60 and the BOAS 66 essentially act as a unitary body with respect to axial movement. The contact between flange 60b and 68a act as a face seal since they remain in contact. This seal can be a primary seal or used in parallel with another seal.

CMC material in general has lower thermal conductivity than superalloys and does not possess the same strength and ductility characteristics as superalloys, making CMCs more susceptible to distress from aerodynamic and/or other loads and thermally induced stresses caused by thermal gradients. Due to tolerances and thermal growth in gas turbine engines, it is difficult to maintain axial spacing at interfaces between a BOAS and the adjacent forward and aft vanes, thus making it difficult to maintain sealing at those interfaces. Moreover, mechanically constraining components to reduce variations at the interfaces is undesirable for CMCs. In these regard, as explained below, the BOAS 66 includes a compliant seal 80.

The aft end 68b of the CMC body 68 includes a seal channel 82 that is defined between radially inner and outer walls 84a/84b of the CMC body 68. The compliant seal 80 is disposed in the seal channel 82 and seals against at least one of the vanes 62 of the second row of vanes 62. For instance, each of the vanes 62 includes a platform 62a with a radially-projecting flange 62b that the compliant seal bears against. The joint formed by the contact between the flange 62b and the compliant seal 80 is non-rigid in that the unitary structure formed by the vane 60 and the CMC body 68 are able to compress and decompress the compliant seal 80, although the compliant seal 80 will still be compressed to some degree in the "decompressed" state in order to provide springback and maintain pressure against the vanes 60/62. For instance, as the vane 60 and CMC body 68 thermally expand, the compliant seal 80 is compressed, and as the vane 60 and CMC body 68 thermally contract, the compliant seal 80 somewhat decompresses. During compression and decompression the compliant seal maintains contact, and thus sealing, with the vane 62, thereby permitting the vane 60 and BOAS 66 to move axially without over-constraint that might otherwise cause distress in the CMC material. Moreover, the springback of the compliant seal 80 facilitates keeping the BOAS 66 in contact with, and thus sealed against, the vane 60.

Figure 3:
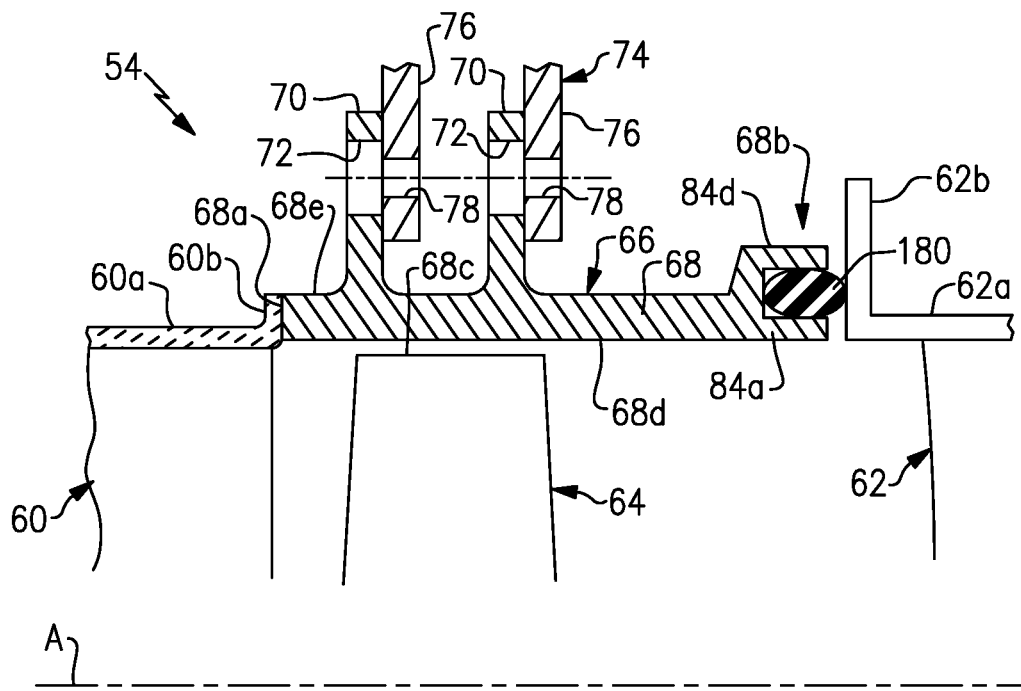
FIG. 3 illustrates the turbine section with a different kind of compliant seal.
Figure 4:
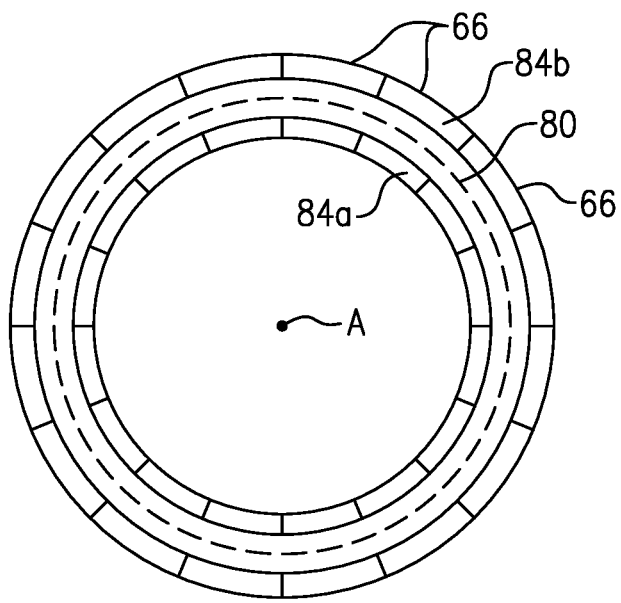
FIG. 4 illustrates a full hoop seal, a seal with a circumferential split, or a multiply seal with an overlapping shiplap split section.

In the example shown, the compliant seal 80 is a spring seal, such as but not limited to, a W-seal. In general, a W-seal has a cross-section that is shaped liked the letter "W." Alternatively, as shown in FIG. 3, the compliant seal 180 is a rope seal. For example, the rope seal 180 is formed of fibers, such as ceramic fibers or metallic fibers. The fibers may be braided, knitted, or woven. Example ceramic fibers include, but are not limited to, oxide fibers. For instance, the ceramic fibers are NEXTEL fibers, which are composed of $Al_2O_3$, $SiO_2$, and $B_2O_3$. Example metallic fibers include, but are not limited to, nickel alloy or a cobalt alloy fibers. The spring seal may have better springback in comparison to the rope seal, but the rope seal may provide better sealing than the spring seal. Additionally, as the compliant seal 80/180 runs circumferentially along the aft end 68b, the compliant seal 80/180 may circumferentially span two or more blade outer air seals 66. For example, as shown in FIG. 4, the compliant seal 80 is a full hoop about the engine axis A and spans all of the blade outer air seals 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
    a turbine section including,
        a core gaspath;
        a first row of vanes disposed in the core gaspath about an engine axis, a second row of vanes in the core gaspath and axially spaced from the first row of vanes, and a row of blades in the core gaspath axially between the first row of vanes and the second row of vanes, each vane of the first row of vanes including a platform with a radially-projecting flange; and
        a row of blade outer air seals axially between the first row of vanes and the second row of vanes and situated radially outwardly of the row of blades, each blade outer air seal including,
            a ceramic matrix composite body defining a core gaspath side facing the row of blades and bounding the core gaspath, a forward end, an aft end, and circumferential sides, the forward end abutting the radially-projecting flange of one of the vanes of the first row of vanes, the aft end including a radially inner wall and a radially outer wall defining radially therebetween a seal channel, the radially inner wall defining, opposite the seal channel, an aft portion of the core gaspath side, and the radially inner wall and the radially outer wall are of equal axial length, and
            a compliant seal disposed in the seal channel and sealing against at least one of the vanes of the second row of vanes.

2. The gas turbine engine as recited in claim 1, wherein the compliant seal is a spring seal.

3. The gas turbine engine as recited in claim 1, wherein the compliant seal is a W-seal.

4. The gas turbine engine as recited in claim 1, wherein the compliant seal is a rope seal.

5. The gas turbine engine as recited in claim 1, wherein the ceramic matrix composite body defines a non-core gaspath side and includes a pair of flanges that projects from the non-core gaspath side, and the pair of flanges includes first and second pin holes that are aligned to receive a pin.

6. The gas turbine engine as recited in claim 1, wherein the compliant seal is a full hoop around the engine axis.

7. The gas turbine engine as recited in claim 1, wherein thermal expansion and thermal contraction of the least one of the vanes of the first row of vanes that is abutting the blade outer air seal causes axial movement of the blade outer air seal to compress and decompress, respectively, the compliant seal.

8. The gas turbine engine as recited in claim 1, wherein the ceramic matrix composite body is a SiC/SiC ceramic matrix composite in which SiC fiber plies are disposed within a SiC matrix.

\* \* \* \* \*